United States Patent [19]
Muldowney et al.

[11] Patent Number: 5,484,578
[45] Date of Patent: Jan. 16, 1996

[54] TWO-PHASE DISTRIBUTOR SYSTEM FOR DOWNFLOW REACTORS

[75] Inventors: Gregory P. Muldowney, Glen Mills, Pa.; Ronald A. Weiss, Flemington, N.J.; Julian A. Wolfenbarger, Newtown, Pa.

[73] Assignee: Mobil Oil Corporation, Fairfax, Va.

[21] Appl. No.: 262,715

[22] Filed: Jun. 20, 1994

[51] Int. Cl.$^6$ ............... B01J 8/02; B01D 11/02; B01D 47/16
[52] U.S. Cl. ............. 422/220; 422/219; 422/275; 422/276; 261/96; 261/97; 261/113
[58] Field of Search ............... 422/220, 211, 422/213, 219, 261, 275, 276; 208/108; 261/97, 96, 113

[56] References Cited

U.S. PATENT DOCUMENTS

| | | | |
|---|---|---|---|
| 2,108,087 | 2/1938 | Thayer | 23/288 |
| 2,898,292 | 8/1959 | Halik et al. | 208/146 |
| 2,924,441 | 2/1960 | Osborne | 261/113 |
| 2,961,304 | 11/1960 | Collins | 422/220 X |
| 3,146,189 | 8/1964 | Kunreuther et al. | 208/146 |
| 3,353,924 | 11/1967 | Riopelle | 23/288 |
| 3,524,731 | 8/1970 | Effron et al. | 23/288 |
| 3,541,000 | 11/1970 | Hanson et al. | 208/108 |
| 3,685,971 | 8/1972 | Carson | 23/288 R |
| 3,787,188 | 1/1974 | Lyon | 422/220 X |
| 4,126,539 | 11/1978 | Derr, Jr. et al. | 208/108 |
| 4,126,540 | 11/1978 | Grosboll et al. | 208/146 |
| 4,133,645 | 1/1979 | Scott | 422/220 |
| 4,140,625 | 2/1979 | Jensen | 208/146 |
| 4,182,741 | 1/1980 | Carson et al. | 422/211 |
| 4,473,600 | 9/1984 | Andrew | 422/218 |
| 4,578,248 | 3/1986 | Nagaoka | 422/310 |
| 4,836,989 | 6/1989 | Aly et al. | 422/195 |
| 5,098,615 | 3/1992 | Resetarits | 261/114.1 |
| 5,098,690 | 3/1992 | Koves | 423/659 |

*Primary Examiner*—Robert J. Warden
*Assistant Examiner*—Christopher Y. Kim
*Attorney, Agent, or Firm*—A. J. McKillop; M. D. Keen

[57] ABSTRACT

A distributor system for uniformly directing vapor and liquid across the surface of a fixed bed of solids in a downflow reactor comprising a distributor tray, and a plurality of open-ended downpipes extending through the tray. A first array of the downpipes has a plurality of vertically spaced elevations of holes above the level of the tray. A second array of the downpipes has at least one elevation of holes at substantially the same height above the level of the tray as one of the upper elevations of holes in the first array of the downpipes. But, the second array has no elevation of holes corresponding to the lowermost elevation of holes, and possibly other lower elevations of holes, in the first array of downpipes. The absence of the lowermost holes in the second array of downpipes causes the liquid flow rate through the distributor tray at a given liquid height to be reduced when that liquid height falls below the elevation of the holes second from the bottom in the first array. This maximizes the liquid height above the lowermost holes, preserving good distribution even when the distributor is subject to variations in level from one point to another.

25 Claims, 2 Drawing Sheets

TWO-PHASE DISTRIBUTOR SYSTEM FOR DOWNFLOW REACTORS

BACKGROUND OF THE INVENTION

The present invention relates to a gas-liquid distribution system for downflow reactors which have one or more fixed beds of solids. Reactors of this type are common in the chemical and petroleum refining industries for catalytic processes such as hydrotreating, hydrocracking, hydrodesulfurization, hydrofinishing, and hydrodewaxing. The distributor system of the present invention is particularly useful for effecting mixed-phase reactions between a liquid and a vapor over a solid catalyst.

Fixed-bed reactors typically contain one or more beds of solid particulate catalyst over which a gas, a liquid, or a gas/liquid mixture passes in a downward flow. Optimal reactor performance is achieved when all catalyst is fully contacted by the process fluid(s).

It is common in fixed-bed reactors to employ multiple solids beds disposed vertically throughout the vessel with injection of gas or liquid between each pair of beds. Interbed injection may be needed to replenish depleted reactants, to quench the process fluids following exothermic reactions, or to introduce a different feed stream. If the beds contain different catalysts, it is possible to stage somewhat different reaction zones within a single vessel. In all cases it is critical to establish good fluid distribution at the top of each catalyst bed.

Distributor design for fixed-bed reactors typically has two objectives. The first is completeness of coverage, which usually involves maximizing the number of points from which the distributor disperses the fluid onto the catalyst. The second is uniformity of coverage, which requires that the amounts of fluid dispersed from each point be equal across the reactor. Of the two, uniformity of coverage is more difficult to achieve because in commercial reactors it is not practically possible to assure perfect levelling of the distributor. Fabrication and installation inaccuracies typically result in variation of ⅛" to ½" in distributor elevation across the diameter of a commercial vessel, and variations as large as ¾" have been measured. Even if perfect leveling could be achieved at the outset, it would likely deteriorate during operation as the reactor internals are subject to thermal expansion and significant static load. Typically distributor design involves accepting a baseline variation in levelness and devising a system to be as insensitive to these variations as possible.

The consequences of poor fluid distribution in fixed-bed reactors can be severe. Poor micro-distribution, that is local dispersion in the area of each distribution point, leads to delayed contacting of reactants, and also to regions of unutilized solids. Poor macro-distribution, that is distribution across the reactor as a whole, leads to lateral temperature gradients, possible phase separation, and deficiency of limiting reactants further down the bed. The overall impact of either type of maldistribution is an apparent loss in catalyst activity, and also a possible failure to meet product specifications. In addition, chronic maldistribution can lead to plugging of part of the solids bed, excessive pressure drop, and premature shutdown.

Many different types of distribution means are known. The simplest ones comprise little more than a pierced or slotted plate. Others have various forms of orifices, weirs, slots, or more complicated devices for promoting the desired uniformity of gas/liquid flow.

U.S. Pat. No. 2,898,292 teaches a distribution means consisting of a plurality of vertical open pipes with notches in the upper rim for liquid overflow. Gas and liquid are introduced onto the catalyst bed at velocities not exceeding 30 feet per second to avoid disturbing the surface of the solids.

U.S. Pat. No. 3,146,189 discloses a distributor tray in which liquid passes onto the solids bed through short pipes, while gas passes through larger and longer pipes which extend downward into the solids bed. This type of distributor is inferior for mixed-phase reactions because it acts to separate the gas and liquid rather than introducing them as a mixture onto the catalyst.

U.S. Pat. No. 3,353,924 provides a gas-liquid distributor consisting of pipes with long vertical slots on the sides so that liquid flow through the distributor increases as liquid level on the tray increases. A simple fluid mechanical analysis of such a device shows that the flow through the pipes varies with the liquid height according to:

$$Q = C \times h^{1.5}, \qquad (I)$$

where
Q=volume flow rate through pipes,
h=height of liquid above bottom of slot, and
C is a constant.

This behavior is undesirable because the 1.5-power dependence on liquid height makes the distributor very sensitive to variations in levelness. In addition, this device uses separate, larger chimneys for gas flow which restricts the number of liquid irrigation points on the tray.

U.S. Pat. No. 3,524,731 teaches a type of pipe distributor using inverted triangular notches rather than straight-sided slots. This approach results in the flow equation:

$$Q = C \times h, \qquad (II)$$

where
Q=volume flow rate through pipes,
h=height of liquid above bottom of notch, and
C is a constant.

Although improved over the 1.5-power dependence of the preceding patent, this device still shows a strong influence of unlevelness. The exact power on liquid height (h) depends on the ratio of altitude to base width of the triangular notches. Moreover, although the liquid flow is normally through the pipes, at high liquid rates liquid also passes by overflow through separate chimneys normally reserved for gas flow. During such operation the rates of liquid flow through the pipes and the chimneys are quite different.

U.S. Pat. No. 3,685,971 provides a pipe distributor with no slots or notches of any type. This is the least effective type of pipe distributor because on an unlevel tray the liquid flow will favor the lowest pipe on the tray almost to the exclusion of the others. The use of any type of slot or notch at the top of the pipe to meter liquid overflow is an improvement over a completely smooth pipe rim.

U.S. Pat. No. 4,126,539 discloses a gas-liquid distributor system having pipe distributors with rectangular notches in the upper rim as well as circular holes between the rim and the tray deck. This patent contemplates that the rectangular notches (weirs) at the top of the pipes define the liquid level on the tray with the circular holes insuring that there is a flow through the pipes of the tray if the liquid level drops below the notches. Thus, this patent contemplates that the distributor system functions at the weirs in a manner similar to the system of U.S. Pat. No. 3,353,924 discussed above.

A distributor of the type disclosed U.S. Pat. No. 4,126,539 can be operated with a liquid height below the rectangular notches in the pipes and above the circular holes. Such operation would be a vast improvement over the above discussed prior art because the bulk of the liquid flow would pass through the holes as a jet which is sheared by the gas passing vertically downward. The shearing action would break up the liquid and would thereby improve gas-liquid contact before the fluids reach the catalyst bed. In this case, the relation between liquid flow and liquid level for the circular holes can be expressed as:

$$Q = C \times h^{0.5}, \quad \text{(III)}$$

where
Q=volume flow rate through pipes,
h=height of liquid above the
centerline of hole(s), and
C is a constant.

Of the art discussed here, such use of the distributor of U.S. Pat. No. 4,126,539 would provide a minimization of sensitivity of liquid flow to variations in level, with the rectangular notches being used for abnormally high liquid rates when the full flow cannot be conveyed through the holes. A disadvantage of such use of this distributor would arise at low liquid flow rates which cause the liquid level on the tray to fall between the top and bottom of the holes. Under these conditions the above flow equation III no longer holds, and a 1.5 power dependence on liquid height makes the distributor strongly sensitive to variations in levelness similar to that discussed above with respect to the slotted pipes of U.S. Pat. No. 3,353,924. A low liquid level could be minimized by sizing the circular holes smaller, but hole diameters less than about ¼" would be impractical due to the possibility of plugging. Thus for a given reactor there is a minimum liquid rate for which downpipes with holes are effective, below which good distribution cannot be guaranteed.

It is known to design gas-liquid distributors with vertical downpipes having holes drilled in the sides to control liquid level on the tray. However, such pipes are fabricated with the same number, size, and location of holes on each, and thus suffer at very low liquid rates from the poor performance noted above.

Although gas-liquid distribution for fixed-bed reactors has been studied and improved upon for many years, it is still common to observe evidence of maldistribution of reactants in commercial reactors. Temperature maldistribution in exothermic processes generally indicates greater fluid flow in one part of the bed versus another. Rapid pressure drop buildup often reveals coking in the bed caused by regions of stagnant flow or insufficient reactants. Fresh (not discolored) catalyst is sometimes found when fixed-bed units are serviced after two to three years in operation, indicating flow bypassing. These findings indicate that at least some aspects of fluid flow in gas-liquid distributors has not been well understood. Yet in the petroleum refining and other industries, public demand and government regulations have dictated the removal of certain compounds from chemical products, necessitating more severe operation and greater need for optimal and reliable reactor performance. Effective distribution in reactors is critical to meeting this demand.

SUMMARY OF THE INVENTION

The present invention avoids the problems of conventional distributor trays by eliminating the extreme sensitivity to level variations at low flow rates. Insensitivity is achieved by providing, on the same tray, at least two different types of downpipe with different numbers of holes for gas-liquid flow such that at very low rates only some of the pipes pass liquid. By strategic sizing of the holes on different sets of pipes, uniformity of liquid dispersion is retained both locally and across the reactor even when only some pipes are active.

The gas-liquid distributor of the present invention provides increased liquid turndown capability over conventional pipe distributors while maintaining good gas-liquid micro- and macro-distribution. Turndown refers to operation at less than the design capacity of the reactor. As used herein, "turndown" or "liquid turndown" contemplates a rate equal to 50% or less of the normal design rate, which may occur due to a process upset in another unit, loss of a utility stream, or to avoid an operating limit such as heat release or pressure drop. Liquid turndown is also used to compensate for catalyst aging, for example as a result of coking. The present invention results in a higher average liquid level on the distributor tray at conditions of significantly reduced liquid throughput than is possible with a conventional tray having identically sized holes on all downpipes. This higher liquid level leads to more uniform flow dispersion onto the catalyst bed.

In accordance with the present invention there is provided a distributor system for uniformly directing vapor and liquid across the surface of a fixed bed of solids in a downflow reactor comprising a distributor tray, and a plurality of vertical, open-ended downpipes extending through the tray. A first array of the downpipes has a plurality of vertically spaced elevations of holes above the level of the tray. A second array of the downpipes has at least one elevation of holes at substantially the same height above the level of the tray as one of the upper elevations of holes in the first array of pipes. But, the second array has no elevation of holes corresponding to the lowermost elevation of holes, and possibly other lower elevations of holes, in the first array of pipes. The absence of the lowermost holes in the second array of pipes causes the liquid flow rate through the distributor tray at a given liquid height to be reduced when that liquid height falls below the elevation of the holes second from the bottom in the first array. This maximizes the liquid height above the lowermost holes, preserving good distribution even when the distributor is subject to variations in level from one point to another.

In accordance with a specific aspect of the invention, the first and second array of downpipes are arranged on the tray to optimize the overlap of outlet liquid spray patterns from the first array at conditions of low liquid flow, thus providing at least substantially equal liquid distribution across the reactor as under conditions when both arrays of pipes are passing liquid. When only the first array of pipes pass liquid, the preferred embodiment of the present invention contemplates that the coverage of the bed will be at least from about 80% to about 95% of the coverage when both arrays pass liquid. To achieve this aspect of the invention, the downpipes must be sized to obtain a diverging conic outlet spray. When suitably sized, the outlet flow pattern from the downpipes is an at least substantially uniform conical spray of liquid droplets dispersed in gas forming a conic angle of about 10 to about 40 degrees.

As used herein "elevation of holes" means a horizontal plane intersecting the identified first or second array of downpipes with each downpipe in the identified array having one or more holes in that plane.

The number of downpipes in the first and second arrays may be equal or different. In addition, the first and second arrays may be laid out on any convenient pitch (e.g. square, triangular or other), but the preferred arrangement is one in which each array is itself a uniform repeating pattern. For example, if a square pitch is considered with the locations corresponding to the black and white squares of a chessboard, the first array might be all white squares and the second array all black squares. Thus, one out of every two pipes would lack at least the lower elevation of holes. Again for example, the first array might be all white squares plus every alternate black square, and the second array the remaining black squares. In this case, one out of every four pipes would lack some holes. The effectiveness of coverage deteriorates once the fraction of pipes in the second array exceeds 50% of the total pipes. On the other hand, the enhancement of liquid turndown declines when the fraction of pipes in the second array falls below about 15%. Accordingly, the preferred arrangements have between one out of two and one out of seven pipes in the second array. Stated differently, the number of downpipes in the first array is from about 50% to about 86% of the total downpipes. The one of seven arrangement is readily accomplished on a triangular pitch where each pipe of the second array is located at the center of a hexagon defined by six pipes of the first array.

It is also contemplated that the downpipes may have as few as two elevations of holes in the first array and one in the second array, the latter corresponding in elevation to the top elevation of holes in the first array. Moreover, the first array may have more than two elevations of holes, with the second array having at least one fewer elevation of holes than the first array. The essential feature which extends liquid turndown capacity is that the bottom elevation of holes be present only on pipes in the first array. Further, each elevation may have one or more holes arranged in any manner around the circumference of the pipes because, as will be discussed hereinafter, the total area of the holes at a given elevation, rather than the specific arrangement of the holes, determines the flow behavior.

The table below gives possible embodiments of the invention in terms of which elevations of holes are present in the first and second arrays. The table may be readily extended to include five or more elevations of holes. In all cases elevation of holes number 1 is at the bottom.

TABLE

| First Array | Second Array |
|---|---|
| 1,2 | 2 |
| 1,2,3 | 2,3 |
| 1,2,3 | 3 |
| 1,2,3 | 2 |
| 1,2,3,4 | 2,3,4 |
| 1,2,3,4 | 3,4 |
| 1,2,3,4 | 2,4 |
| 1,2,3,4 | 4 |
| 1,2,3,4 | 3 |
| 1,2,3,4 | 2 |

A preferred embodiment of the present invention would depend on the ranges of liquid and gas rate anticipated for a given reactor service. In general, the greatest liquid turndown will occur when the elevation(s) of holes in the second array correspond to the uppermost elevation(s) of holes in the first array. For example, for the four-holes case, this would occur when the second array has elevations 3 and 4 or elevation 4 only, as opposed to elevations 2 and 4, elevation 2 only, or elevation 3 only. However, one of the latter cases may be preferred for secondary considerations, such as better balancing of flow through the first and second arrays at normal liquid rates, particularly if the duration of low-liquid-flow operation is expected to be limited.

The distribution system of the present invention is particularly useful in new or revamped hydroprocessing units in which hydrogen is reacted with hydrocarbons to produce fuel or lube products. These units typically run for several months to several years on a single catalyst fill, and as catalyst activity diminishes from start-of-run to end-of-run both temperature and hydrogen circulation rate are increased to maintain reaction rates. Both higher temperature and higher hydrogen rate lead to a progressively greater fraction of vapor in the reactor as the run proceeds, which gradually reduces the liquid rate through the distributor(s). It is not uncommon for the hottest beds of hydroprocessing reactors to approach 100% vapor near the end of the operating cycle. The present invention is directly applicable to such units and avoids the prior art problems of poorer distribution as liquid level on the tray decreases, thus maintaining maximum use of the catalyst even towards the end of the cycle when incremental stream time can be extremely valuable.

DESCRIPTION OF SPECIFIC EMBODIMENTS

Figure 1:
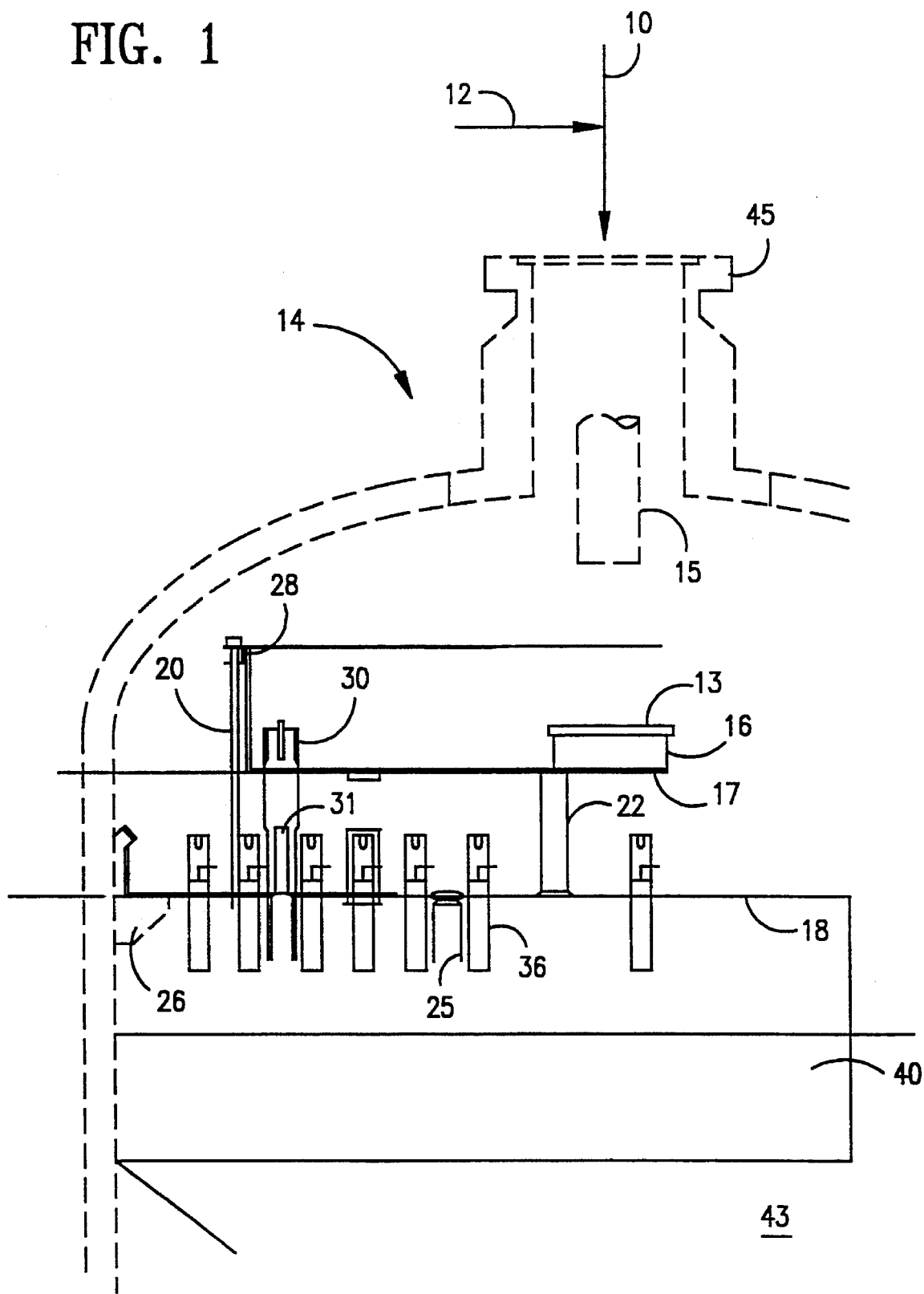
FIG. 1 is a vertical section of the top portion of a fixed bed reactor showing an embodiment of a distributor system in accordance with the present invention.

In a typical fixed-bed hydroprocessing reactor such as that shown in FIG. 1, a preheated oil stream 10 is mixed with a hydrogen-containing gas 12 and fed to the top of a downflow reactor 14 through an inlet pipe 15. At the feed inlet temperature, which may be on the order of 550° F. to 600° F. at start-of-cycle, the feed/hydrogen mixture is usually a two-phase stream. The vapor phase typically contains hydrogen and light gases such as methane and ethane which are recycled with it, plus the lightest hydrocarbons vaporized from the oil feed 10. The exact vapor-to-liquid ratio in the mixed-phase stream entering the reactor 14 depends on the operating temperature and pressure, the amount of hydrogen-containing gas introduced, and the type and boiling range of the hydrocarbon feed. As all of these factors can and do change during the operating cycle, the inlet vapor fraction varies significantly with time on stream. The end-of-cycle temperature for a typical hydroprocessing reactor may be about 100° F. to 200° F. above the start-of-cycle temperature.

The two-phase stream entering through the inlet pipe 15 strikes a target plate 13 supported by vertical elements 16, and disperses radially onto a flash pan 17, at times called a rough-cut distributor, where the vapor phase disengages from the liquid phase. The target plate 13 acts to withstand the incoming momentum of the feed stream which would otherwise cause wear to the flash pan 17. The flash pan 17 and the liquid thereon are supported at the perimeter by a plurality of rods 20, and beneath the center by a vertical element 22. There is no attachment between the flash pan 17 and the reactor wall to impede vapor flow around the perimeter of the flash pan 17, but a vertical wall 28 of the flash pan 17 prevents a similar flow of liquid. The flash pan or rough-cut distributor 17 may take other forms or be omitted entirely depending on the application.

The liquid portion of the feed mixture flows downward through a number of downcomer pipes 30 arranged about the perimeter of the flash pan 17 and leading to a distributor tray 18. A fraction of the vapor also passes through the downcomer pipes 30 along with the liquid while the remainder flows over the wall 28 and around the perimeter of the flash pan 17. In this way both phases are conducted in a quiescent manner to the distributor tray 18 without producing excessive foaming or rippling of the liquid surface on the tray 18. The downcomer pipes 30 also provide support for flash pan 17 as they rest on distributor tray 18. The lower portion of the downcomer pipes 30 have vertical notches 31 for passage of the gas-liquid mixture onto the distributor tray 18.

The distributor tray 18 has a large number of vapor/liquid downpipes 36 arranged thereon. When there is no rough-cut distributor 17, each downpipe 36 may have a cap spaced above the upper rim to absorb the momentum of the incoming liquid flow. Preferably the locations of the downpipes 36 form a uniform grid, but some pipe locations may depart from the grid to avoid support beams or other internal members. The downpipes 36 are vertically disposed tubes with open ends which extend above and below the tray 18 by one or more tube diameters. The lowest holes on any downpipe 36 are suitably ¼ inch to several inches (at the center of the hole) above the top surface of the tray 18 to prevent scale, sludge, or other solid matter conveyed in the liquid phase from passing through the tray 18 onto the solids bed below. Thus, the presence of the downpipes 36 ensures that a pool of liquid is maintained on the tray 18. It is generally preferred that at least the bottom hole and more preferably several of the holes in the downpipes 36 be entirely submerged in the standing liquid.

The solids bed is typically topped with several inches of inert material 40 to maintain the level of the catalyst and to enhance initial distribution of the process fluids over the catalyst bed 43.

The pipes 36 conduct substantially all of both the vapor and liquid flow. Some trays feature a few drain holes in the deck which allow a small amount of liquid to pass directly through the tray, but the flow through the drain holes is generally negligible compared to that through the downpipes. Drain holes are provided to allow the tray to drain completely of liquid during a shutdown, which is otherwise not possible because the lowest hole on any pipe is somewhat above the deck.

Figure 2:
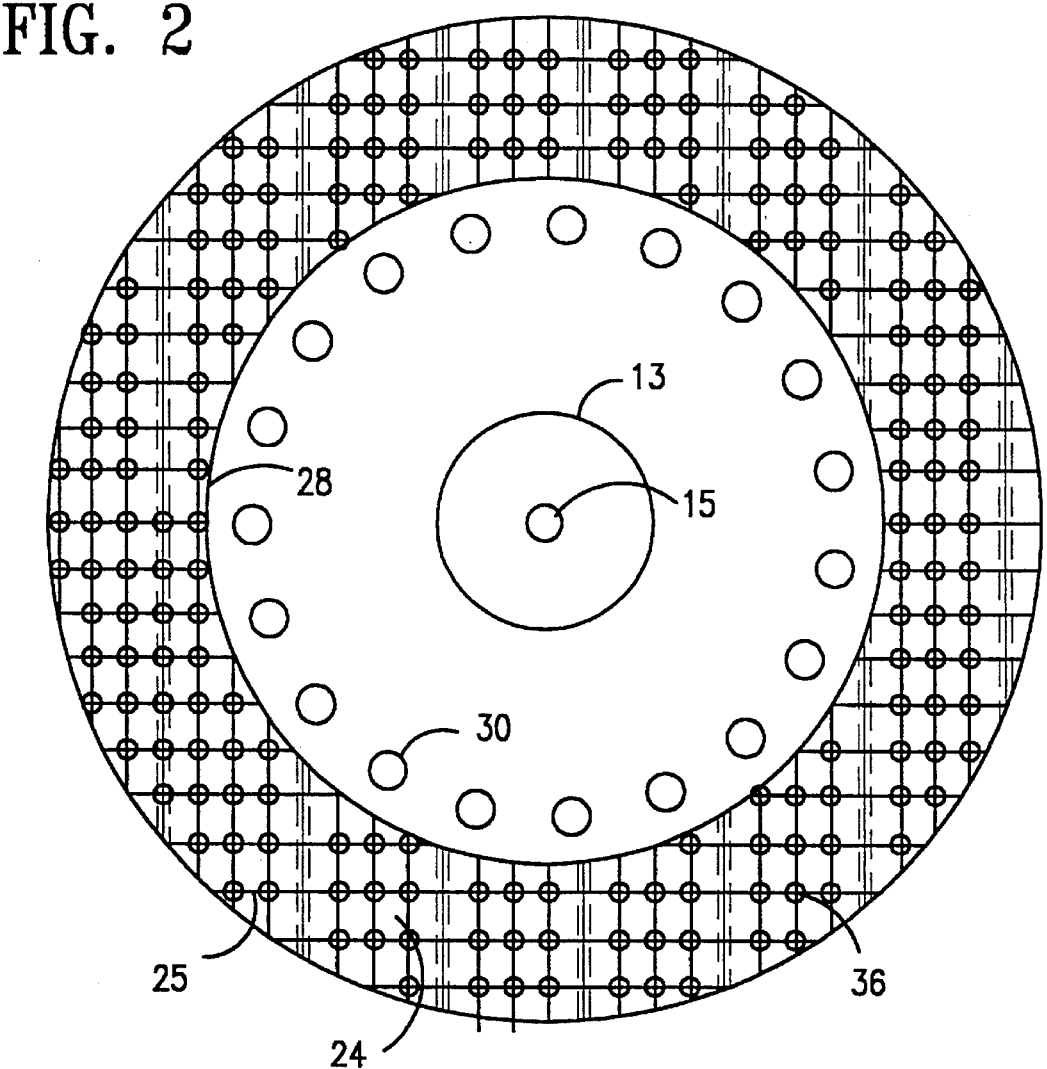
FIG. 2 is a cross-sectional view of the distributor system taken along line II—II of FIG. 1.

The diameter of a commercial hydroprocessing reactor is typically between about 6 and 18 feet. As shown in FIG. 2, the distributor tray 18 is most often formed of a plurality of variously shaped sections 24 assembled within the reactor 14 and supported by flanged beams 25 bolted to support lugs 26 spaced around the inner perimeter of the reactor 14. The tray 18 is fabricated and transported as sections 24, each of which are small enough along one dimension to pass through a manway 45 at the upper end of the reactor 14. The downpipes pipes 36 generally are preinstalled and welded in each section during fabrication. Once in the vessel the sections 24 are bolted and gasketed to the beams 25. Less frequently, the distributor tray 18 consists of a single solid circular plate welded in place during the original fabrication of the vessel 14. A solid distributor tray eliminates the possibility of leaks, but severely restricts access and maintenance within the reactor. Once the distributor tray 18 is in place, the flash pan 17 and the target plate 13 are constructed thereon.

Figure 3:
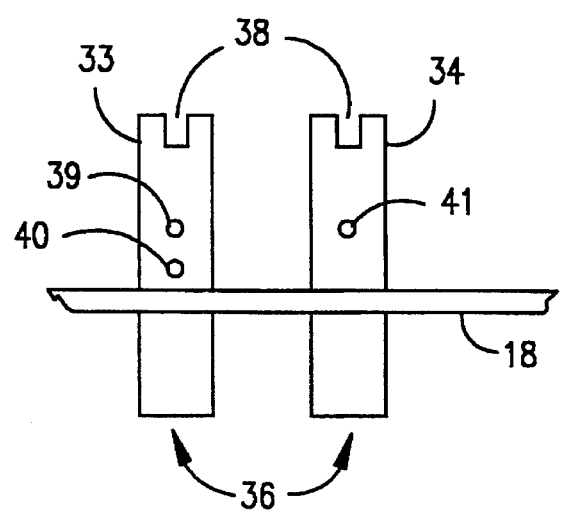
FIG. 3 is a detailed view of two distributor downpipes used in the embodiment of FIG. 1.

FIG. 3 details a pair of downpipes 36. In this embodiment a first array of downpipes 33 includes every alternate location on a square grid, and each downpipe 33 in the first array has two holes 39,40 vertically spaced above the tray 18 which are in fluid communication with the pipe interior. A second array of the downpipes 34 also includes every alternate location on a square grid, while each downpipe 34 in the second array has one hole 41 at essentially the same elevation as the top hole 39 in the downpipes 33 of the first array.

The top holes 39 in the downpipes 33 of the first array and the holes 41 in the downpipes 34 of the second array are preferably not the same size. Although the present invention will still provide liquid turndown and distribution superior to conventional pipe distributor trays if the top holes in both arrays are the same size, this preferred embodiment includes sizing the holes according to a specific formula discussed hereinafter.

Thus, during periods when the liquid height on the tray 18 falls below the top elevation of holes, the absence of the lower hole in the second array of downpipes 34 causes the liquid height on the tray 18 to be higher at a given liquid flow rate than would obtain if all the downpipes on the tray 18 had identical holes.

An aspect of the present invention is the discovery that the outlet streams from the downpipes 36 diverge into conical sprays because the streams lose momentum to the comparatively stagnant gas between the distributor tray 18 and the inerts layer 40 located above the catalyst bed 42. The extent of divergence depends on the liquid and gas flow rates, the fluid properties, and the dimensions of the downpipes 36. On typical pitches the conical outlet sprays approach one another or partially overlap. For this reason the liquid coverage at the top of the solids bed 40 is minimally compromised even when the second array of pipes 34 which have only one hole are passing no liquid at all. The coverage is typically at least about 80% to about 95% of the coverage obtained when all downpipes 36 are passing liquid, and can approach 100% coverage.

It is preferable that the downpipes 36 of both the first and second arrays feature one or more notches 38 in the top rim to conduct liquid during periods of abnormally high flow. High flow may occur due to an interval of higher than design feed rate, an unplanned surge of incoming liquid, or, much more rarely, a general rise in the liquid level on the tray due to plugging of most of the downpipe holes. The notches result in less sensitivity of liquid flow to liquid height when the tray is imperfectly levelled than would occur if the rims were unnotched. The notches may be rectangular, triangular, semicircular, or of various other shapes, and are distinct and unconnected to any of the holes in the downpipes.

The present invention contemplates that the downpipes 36 in the first and second arrays may be of different diameter or that each array may contain pipes of various diameters. It is also within the scope of the present invention that the holes in the pipes of either array may be of any shape whatsoever, including circular, elliptical, square, rectangular, triangular, or other form. Similarly the number and layout of holes at each elevation may be one or more arranged in any manner around the circumference of the downpipes. In the equations which follow only the total area of the holes at a given elevation is pertinent. The total area, once determined, may be realized at that elevation by any number of holes of any shape and arrangement through the downpipe wall.

For downpipes of either the first or second array which contain two or more elevations of holes, it is preferred but not essential for a given hole to be somewhat displaced in the angular coordinate from the holes directly above and/or below it. For example, if the bottom hole is considered to lie at an angle of 0° or 180° when viewed from the top, preferably the hole above it should lie between 10° and 170° or 190° and 350°. Progressively higher holes should be distributed as evenly as possible around the perimeter of the of the pipe. When only two elevations of holes are present, the holes of the second elevation are most preferably angularly spaced 90° or 270° relative to those of the first elevation when viewed from the top.

Although FIG. 1 shows the present invention applied at the top bed of a fixed-bed reactor, the invention is identically applicable between any two beds of a multi-bed reactor, regardless of whether or not gas or liquid is added or withdrawn between the beds. Typically the fraction of liquid and vapor in the process fluid changes from the top to the bottom of the reactor. If the change is large it may be preferred to use downpipes and holes of different dimensions on the various trays throughout a multi-bed unit. This preference must be weighed against the greater cost of nonidentical trays, and the additional care required to install the correct trays in each position.

METHODOLOGY FOR SIZING DISTRIBUTOR DOWNPIPES

In contemplating a distributor for gas-liquid downflow, more than one operating mode is typically considered resulting in a set of cases each specified by a total gas rate and a total liquid rate. The fluid rates must be determined at process conditions using applicable thermodynamics at the prevailing temperature and pressure, and the following fluid properties determined: gas density, gas viscosity, liquid density, liquid viscosity, and liquid surface tension.

The vessel diameter is fixed by considerations other than fluid distribution (e.g. available space) and is assumed to be known at the outset of the tray design process. Based on this diameter an approximate count of downpipes is determined by adopting a pitch spacing. For maximum coverage the pitch is typically chosen as small as practically possible, that is the downpipes are located as close to each other as fabrication will permit. Common pitches vary from 1 to 2 feet to several inches depending on the importance of maximizing coverage. The allowable pitch is typically restricted by the position of tray support beams and other internal members. Once the number of downpipes is known, the gas and liquid rates per downpipe are calculated, considering at this point that all the downpipes are alike.

The next dimension to be determined is the diameter of the downpipes. Too large a diameter limits the number of pipes on the distributor tray. Too small a diameter results in excessive pressure drop across the distributor tray. Between these extremes is typically a range of diameters ranging from a few inches to less than about ½". A convenient pipe size is chosen for first-pass calculations with the possibility of subsequently fine-tuning the diameter. Multiple diameters may also be used on the same tray.

The downpipes in the first array, that is those having all the holes, are designed first, using the design case with the highest liquid flow rate. The following equations are presented for a downpipe having holes at two elevations, but the formulas are readily extended to pipes having three or more elevations of holes. As noted above, the total hole area at a given elevation is calculated, and this total area may be realized by any number of holes through the downpipe wall at that elevation. Thus, as used herein, "hole(s)" means one or more holes in a downpipe at a given elevation.

At any single elevation an equation relating liquid height to liquid flow rate is:

$$h = H + f(A, \rho_L) Q_L^2 + g(A, \rho_L, \rho_G, Q_G) Q_L, \quad \text{(IV)}$$

where
- $h$ = liquid height above top surface of tray,
- $H$ = height of hole center above top surface of tray,
- $A$ = total area of the hole(s) at an elevation,
- $\rho_L$ and $\rho_G$ = liquid and gas densities, respectively,
- $Q_L$ and $Q_G$ = liquid and gas volume flow rates per downpipe, respectively, and
- $f$ and $g$ are functions readily obtained by a pressure balance at the downpipe holes.

The physical constraint which defines the $f$ and $g$ functions is equality of pressure between the liquid and the gas at two locations: the top surface of the standing liquid, and the point in the interior of the pipe where the phases return to pressure equilibrium.

In designing a two-elevation pipe such as the two-hole downpipe 33 equation (IV) is written once for the top hole 39 and once for the bottom hole 40, that is with different values of H and possibly different values of A, creating two equations in the four unknowns comprising: $h_{TOP}$, $Q_{L\ TOP}$, $h_{BOTTOM}$, and $Q_{L\ BOTTOM}$. The other two equations needed to close the system are:

$$h_{TOP} = h_{BOTTOM} \quad \text{(V)}$$

$$Q_{L\ TOP} + Q_{L\ BOTTOM} = Q_L \quad \text{(VI)}$$

Equation (V) requires that the liquid height governing the top and bottom holes be the same, and equation (VI) requires that the sum of the liquid flows through the top and bottom holes equal the total liquid flow per downpipe. Design of the first array pipes consists of choosing values for the areas (A) and locations (H) of the top 39 and bottom 40 holes for highest expected liquid flow rate through the tray, solving equations (IV), (V) and (VI) by trial-and-error to determine the liquid height (h) on the tray, and adjusting the hole areas (A) and locations (H) until the liquid height (h) is satisfactory or at a predetermined level above the top hole.

The holes in the downpipes 34 of the second array are sized by solving equation (IV) for the area (A) of the hole 44 in each pipe needed to pass the same amount of liquid ($Q_L$) at the same liquid height (h) as the two-hole downpipe 33. The calculation is again specific to the case with the highest liquid flow rate when all downpipes would be expected to pass liquid. This is also a trial-and-error calculation because the area (A) appears in a complex manner in two terms of equation (IV).

Following the hole sizing for the case of highest contemplated liquid flow to the distributor tray, the system is evaluated for the case of lowest expected liquid flow rate to determine what fraction of the downpipes should be in the second array, and thus lack bottom holes. This evaluation is accomplished by applying equation (IV) to a pipe of the first array to determine what liquid flow rate per downpipe would result in the liquid height being comfortably above the bottom hole, but below the top hole. The result will be some value $Q_L^*$ greater than the actual flow rate per downpipe $Q_L$. The ratio of the actual $Q_L$ to the target $Q_L^*$ is the fraction of pipes which must be first array members. The remaining pipes are designated as the second array. This step usually requires several repetitions since the fraction of pipes in the second array preferably must correspond to a uniform grid spacing. It is often necessary to make small adjustments to the holes sizes during this step. Also, it is sometimes preferred to instead try fixed fractions of second array pipes corresponding to convenient grid spacings and check for acceptable liquid level.

Once the number of downpipes in each array is fixed and the hole sizes are known, the first-pass design is completed. Adjustments must be made to the first pass design because the foregoing calculations are based on the assumption that gas rates through the downpipes of the first array and the second array are equal which generally is not accurate. The partitioning of the gas flow is determined by the pressure drop across the first array of downpipes versus the pressure drop across the second array of downpipes. When both sets of downpipes are passing liquid, the pressure drops across member pipes of each set are similar, through not identical because the different numbers of liquid jets in the two types of pipe result in somewhat different degrees of shear. When only the first array downpipes are passing liquid, the gas flow will slightly favor the second array of pipes because the effective flow area in the second array of pipes is larger due to the absence of liquid therein. The following pressure drop equation (VII) provides an analysis of gas flow.

$$\Delta p = \phi(A_p, Q_G, \rho_G, \mu_G) + \psi(A_p, Q_G, Q_L, \rho_g, \rho_L, \mu_G, \mu_L, \sigma_L) \quad \text{(VII)}$$

where
- $\Delta p$ = pressure drop across the full length of the downpipe,
- $A_p$ = cross-sectional area for flow in the downpipe,
- $Q_L$ and $Q_G$ = liquid and gas volume flow rates per downpipe, respectively,
- $\rho_L$ and $\rho_G$ = liquid and gas densities, respectively,
- $\mu_L$ and $\mu_G$ = gas and liquid viscosities, respectively,
- $\sigma_L$ = liquid surface tension,
- $\phi$ = pressure losses in the length of the downpipe between the upper rim and the top hole, and
- $\psi$ = pressure losses in the two-phase section of the downpipe between the top hole and the lower rim of the downpipe.

In equation VII, $\phi$ is a function describing pressure losses in the length of the downpipe between the upper rim and the top hole, which is specific to the number and type of notches in the upper rim. The function $\psi$ is a function describing pressure losses in the two-phase section between the top hole and the bottom end of the downpipe, which is specific to the number, elevation, and relative position around the pipe circumference of the holes. Gas flow to each type of downpipe is determined for a given design case by writing equation (VII) once for a first-array downpipe and once for a second-array downpipe. For the highest flow case the values of $Q_L$ will be substantially equal for each array pipe, but for other design cases, and in particular for the low-flow case, the values of $Q_L$ will differ significantly. The values of $Q_G$ to be used are those used in equation (IV) for liquid height, which are equal for the first and second arrays during the initial calculation. Using equation (VII) the pressure drop across the first array and second array of downpipes are computed. When the pressure drops are equal, the design is consistent and complete.

However, after the first-pass calculation the pressure drops cannot be equal because the gas rates were assumed equal even for the low-flow case when the second array of downpipes is inactive. Thus an outer loop of iteration must be undertaken in which the gas flow rate to the first array of downpipes is guessed, the gas flow rate to the second array of downpipes is obtained as the difference between the guessed first array gas flow and the total gas flow, and all of the foregoing calculations repeated until the degree of gas partitioning is arrived at which reconciles the liquid height and pressure drop equations for all design cases. This procedure is not practical for hand calculation and is preferably executed by a digital computer. A suitable numerical technique for solving these equations is a Newton-Raphson method. It should be noted that the equations (I) though (VII) are nondimensional, i.e. any consistent set of units can be used.

Successful completion of the design procedure occurs when downpipe diameters and locations, hole sizes and locations, and other details as noted above give a liquid height above the bottom elevation of holes for all design cases, and above higher elevations of holes in as many design cases as possible. The fundamental requirements for realizing the maximum benefits of the present invention are that the bottom holes of the first array be submerged in all cases and that the downpipes of the first array be arranged on the tray to provide maximal coverage when the pipes of the second array are inactive.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A two-phase distributor system for directing vapor and liquid downwardly across the surface of a fixed bed of solids comprising:
   a distributor tray;
   a plurality of vertical, open-ended downpipes extending through said tray;
   a first array of said downpipes having a plurality of vertically spaced elevations of holes above the level of said tray; and
   a second array of said downpipes having an elevation of holes at substantially the same height above the level of said tray as at least one of the elevations of holes in said first array, and having no elevation of holes corresponding to the lowermost elevation of holes in said first array;
   whereby the liquid flow rate through said distributor tray at a given liquid height is reduced when said liquid height falls below the elevation of the lowermost holes in said second array, thereby maximizing the liquid level above the lowermost elevation of holes in said first array.

2. The system of claim 1 wherein said first and second arrays of downpipes are sized and arranged on said tray for providing at least substantially equal liquid coverage of the surface of said fixed bed of solids when the liquid height on said tray falls below the lowermost elevation of holes in said second array as is achieved when the liquid height falls above the lowermost elevation of holes in said second array.

3. The system of claim 1 wherein said first and second arrays of downpipes are sized and arranged on said tray for providing at least substantially equal insensitivity of liquid distribution due to variations in liquid height of said tray when the liquid height on said tray falls below the lowermost elevation of holes in said second array as is achieved when the liquid height is located above the lowermost elevation of holes in said second array.

4. The system of claim 1 wherein the downpipes in said first array have two vertically spaced elevations of holes, and the downpipes in said second array have one elevation of holes at the same centerline elevation as the top elevation of holes in the downpipes in said first array.

5. The system of claim 4 wherein there is a single hole in each downpipe at each of the two vertically spaced elevations in said first array and at the one elevation in said second array.

6. The system of claim 5 wherein the bottom hole in each downpipe in said first array is circumferentially displaced from the top hole by from about 10° to about 170° or from about 190° to about 350° when viewed from the top.

7. The system of claim 5 wherein the bottom hole in each downpipe in said first array is circumferentially displaced from the top hole by about 90° or about 270° when viewed from the top.

8. The system of claim 1 wherein the downpipes in said first array have at least three vertically spaced elevations of holes.

9. The system of claim 8 wherein the downpipes in said first array have three vertically spaced elevations of holes, and wherein downpipes in said second array have one elevation of holes at the same centerline elevation as the top elevation of holes in said first array.

10. The system of claim 8 wherein the downpipes in said first array have three vertically spaced elevations of holes, and the downpipes in said second array have two elevations of holes at the same respective centerline elevations as the top two elevations of holes in the downpipes in said first array.

11. The system of claim 1 wherein the holes in the downpipes of said first and second arrays are sized such that substantially equal liquid flows are achieved through all downpipes on said distributor tray when said liquid height falls above said lowermost elevation of holes in said second array of downpipes.

12. The system of claim 1 wherein the holes in the downpipes of the first and second arrays are sized in accordance with the following liquid height equation:

$$h = H + f(A, \rho_L) Q_L^2 + g(A, \rho_L, \rho_G, Q_G) Q_L,$$

where
 h=liquid height above top surface of tray,
 H=height of hole center above top surface of tray,
 A=total area of the hole(s) at an elevation,
 $\rho_L$ and $\rho_G$=liquid and gas densities, respectively,
 $Q_L$ and $Q_G$=liquid and gas volume flow rates per downpipe, respectively, and
 $f$ and $g$=functions readily obtained by a pressure balance at the downpipe holes; and the liquid height equation being written once for said first array of downpipes and once for said second array of downpipes, subject to the constraints that the liquid height (h) governing each hole be the same, and that the sum of the liquid flows through all holes equal the total liquid flow through said tray.

13. The system of claim 12 wherein the number of downpipes in said first array is determined by applying the liquid height equation to a downpipe of said first array to calculate the liquid flow rate per pipe leading to a liquid level acceptably spaced above said bottom elevation of holes, taking the ratio of the actual liquid flow rate per pipe to the calculated value, and designating the result as the fraction of downpipes assigned to the first array.

14. The system of claim 1 wherein the number of downpipes in said first array is from about 50% to about 86% of the total downpipes.

15. The system of claim 1 wherein said first array comprises 50% of the total downpipes, and the downpipes in said first array and said second array are arranged on a square grid at locations corresponding to the black and white squares, respectively, of a chessboard.

16. The system of claim 1 wherein the downpipes of said first array comprise 75% of the total downpipes and are arranged on a square grid at the locations corresponding to the white squares and the alternate black squares of a chessboard, and wherein the downpipes of said second array comprise 25% of the total downpipes and are arranged on said square grid at the locations corresponding to the remaining black squares of said chessboard.

17. The system of claim 12 wherein the partitioning of gas flow between the downpipes of said first array and said second array is determined by solving simultaneously the liquid height equation and the following pressure drop equation:

$$\Delta p = \phi(A_p, Q_G, \rho_G, \mu_G) + \psi(A_p, Q_G, Q_L, \rho_G, \rho_L, \mu_G, \mu_L, \sigma_L),$$

where
 $\Delta p$=pressure drop across the full length of the downpipe,
 $A_p$=cross-sectional area for flow in the downpipe,
 $Q_L$ and $Q_G$=liquid and gas volume flow rates per downpipe, respectively,
 $\rho_L$ and $\rho_G$=liquid and gas densities, respectively,
 $\mu_L$ and $\mu_G$=gas and liquid viscosities, respectively,
 $\sigma_L$=liquid surface tension,
 $\Phi$=pressure losses in the length of the downpipe between the upper rim and the top hole, and
 $\psi$=pressure losses in the two-phase section of the downpipe between the top hole and the lower rim of the downpipe.

18. The system of claim 1 wherein the holes in said downpipes are circular.

19. The system of claim 1 wherein the holes in said downpipes are elliptical.

20. The system of claim 1 wherein said downpipes are sized for providing outlet flow patterns having at least substantially uniformly conical sprays of liquid droplets dispersed in gas forming a conic angle of 10 to 40 degrees.

21. The system of claim 20 wherein said downpipes are sized and spaced for providing at least partially overlapping conical sprays at the surface of said fixed bed of solids when said liquid level on said tray falls below said lowermost elevation of holes on the downpipes of said second array.

22. The system of claim 1 wherein said fixed bed of solids comprises catalyst in a downflow reactor.

23. A down-flow hydroprocessing reactor comprising at least one fixed bed of catalyst, means for supplying a preheated oil stream mixed with a hydrogen-containing gas to the upper part of the reactor to form a vapor and liquid mixture, and a two-phase distributor system for directing the vapor and liquid mixture downwardly across the surface of the catalyst bed; said distributor system comprising:

a distributor tray beneath the oil stream;

a plurality of vertical open-ended vapor/liquid downpipes extending through said tray;

a first array of said downpipes having a plurality of vertically spaced elevations of holes above the level of said tray; and a second array of said downpipes having an elevation of holes at substantially the same height above the level of said tray as at least one of the elevations of holes in said first array, and having no elevation of holes corresponding to the lowermost elevation of holes in said first array;

whereby the liquid flow rate through said distributor tray at a given liquid height is reduced when said liquid height falls below the elevation of the lowermost holes in said second array, thereby maximizing the liquid level above the lowermost elevation of holes in said first array.

24. The system of claim 23 wherein the two-phase distributor system further comprises a flash pan located above said distributor tray; said flash pan including a plurality of liquid/vapor downcomer pipes leading to said distributor tray, and a side peripheral wall spaced from the inner wall of the reactor for permitting downward vapor flow through the space between said flash pan and the inner wall of the reactor.-

25. The system of claim 24 wherein the two-phase distributor system further comprises a target plate located within and spaced from the bottom and side peripheral wall of said flash pan for radially deflecting the oil stream onto said flash pan.

* * * * *